(12) United States Patent
Ouyang et al.

(10) Patent No.: US 7,724,834 B2
(45) Date of Patent: May 25, 2010

(54) SYSTEM AND METHOD FOR MAXIMUM LIKELIHOOD DECODING IN MULTIPLE OUT WIRELESS COMMUNICATION SYSTEMS

(75) Inventors: Xuemei Ouyang, San Jose, CA (US); Pen Li, San Jose, CA (US); Monisha Ghosh, Chappaqua, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 720 days.

(21) Appl. No.: 11/571,366

(22) PCT Filed: Jun. 27, 2005

(86) PCT No.: PCT/IB2005/052128

§ 371 (c)(1),
(2), (4) Date: Dec. 28, 2006

(87) PCT Pub. No.: WO2006/003607

PCT Pub. Date: Jan. 12, 2006

(65) Prior Publication Data

US 2009/0190682 A1    Jul. 30, 2009

Related U.S. Application Data

(60) Provisional application No. 60/584,203, filed on Jun. 30, 2004.

(51) Int. Cl.
*H04L 5/12* (2006.01)
(52) U.S. Cl. .................................... 375/262
(58) Field of Classification Search ............... 375/262, 375/265, 341; 704/242; 714/792, 795; 370/207; 455/428
See application file for complete search history.

(56) References Cited

U.S. PATENT DOCUMENTS

2001/0021233 A1*  9/2001  Jin .............................. 375/341

OTHER PUBLICATIONS

"A New Branch metric Generation Method for Soft-Decision Viterbi Decoding in Coded OFDM-SDM Systems Employing MLD over Frequency Selective MIMO Channels", by S. Hori et al., IEEE Trans. Fundamentals, vol. E85, No. 7, Jul. 2002, pp. 1675-1684.
"A Zero-Forcing Approximate Log-Likelihood Receiver for MIMO Bit-Interleaved Coded Modulation", by Michael R.G. Butler et al., IEEE Communications Letters, 2003.
"On Maximum-Likelihood Detection and the Search for the Closest Lattice Point", by Mohamed Damen et al., IEEE Trans. on Info. Theory, vol. 49, No. 10, Oct. 2003.

(Continued)

*Primary Examiner*—Sam K Ahn
(74) *Attorney, Agent, or Firm*—Larry Liberchuk

(57) ABSTRACT

A system and method for a simplified Maximum Likelihood (ML) decoding (203) for MIMO systems is provided. The full ML decoding gives the lower bound of the decoding for CC coded MIMO systems. However, the computation cost is too high to be implemented in real system. Many alternative methods have been proposed for the decoding. Among them, weighted Zero Forcing (WZF) is one that can give affordable performance with reasonable computation complexity but there are several dB of performance gap for the WZF decoding and ML decoding. This present invention discloses a decoding system and method having improved performance over WZF decoding with affordable implementation complexity.

12 Claims, 6 Drawing Sheets

OTHER PUBLICATIONS

"On the Design of MIMO Block-Fading Channels with Feedback-Link Capacity Constraint", by Vincent Lau et al., IEEE Transactions on Communications, Vo. 52, No. 1, Jan. 2004.

"V-BLAST: An Archituecture for Realizing very High Data Rates over the Rich-Scattering Wireless Channel", by P.W. Wolniansky et al., 1998.

* cited by examiner

SYSTEM AND METHOD FOR MAXIMUM LIKELIHOOD DECODING IN MULTIPLE OUT WIRELESS COMMUNICATION SYSTEMS

The present invention relates to a system and method for simplified Maximum Likelihood (ML) decoding method for Multiple-In-Multiple-Out (MIMO) wireless communication systems Multiple in Multiple out (MIMO) is gaining increasing attention in wireless network applications because MIMO has the potential to provide better frequency efficiency than a single antenna system, although the implementation complexity is higher than for a single antenna communication system.

The implementation cost is higher not only because of the hardware increase resulting from the increased number of antennas, but also because of the costs associated with the decoding higher complexity. When a system has multiple inputs, joint detection of the multiple inputs is optimal. However, joint detection is subject to very high computational complexity. Thus most of the MIMO decoding focuses on non-optimal but computationally affordable methods, such as Zero Forcing (ZF) and Ordered Successive Interference Cancellation (OSIC), see Wolniansky, P. W. et al., "V-BLAST: an architecture for realizing very high data rates over the rich-scattering wireless channel", ISSSE 98, pp 295-300, which is hereby incorporated by reference on its entirety. Speth, et al, "Low complexity spaced frequency MLSE for multi-user COFDM", GLOBECOM '99, Vol. 5, 1999, pp 2395-2399, which is hereby incorporated by reference in its entirety, provides a simplified decoding based on optimal ML decoding. But the main idea is still ZF. The difference is that the method proposed in Speth et al. uses the channel state information to weight the bit metrics, whereby it came to be called Weighted Zero Forcing (WZF) decoding.

Although WZF currently is the choice for MIMO decoding because of its simplicity, there is still a several dB performance gap between the optimal ML decoding and WZF. Research is on going to find a decoding method that eliminates the performance gap with reasonable implementation cost.

Thus, there is a need for a system and method for improving on existing WZF MIMO decoding.

The present invention provides a totally different decoding method than ZF for MIMO wireless systems.

The system and method of the present invention is based on the optimal ML decoding that, instead of performing a norm 2 calculation of the joint detection, performs a more simple calculation. The simpler calculation reduces the number of multiplications required to a more affordable level for implementation.

According to a simulation, the performance of a first embodiment of the simplified ML decoding method provides a 2 dB gain over WZF for a packet error rate (PER) level of $10^{-}$.

According to a simulation, the performance of a second embodiment of the simplified ML decoding method provides a 4 dB gain over WZF for PER level of $10^{-2}$ for 16/64 Quadrature Amplitude Modulation (QAM) modulation and 8 dB gain for Binary Phase Shift Keying (BPSK) modulation.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

Figure 1:
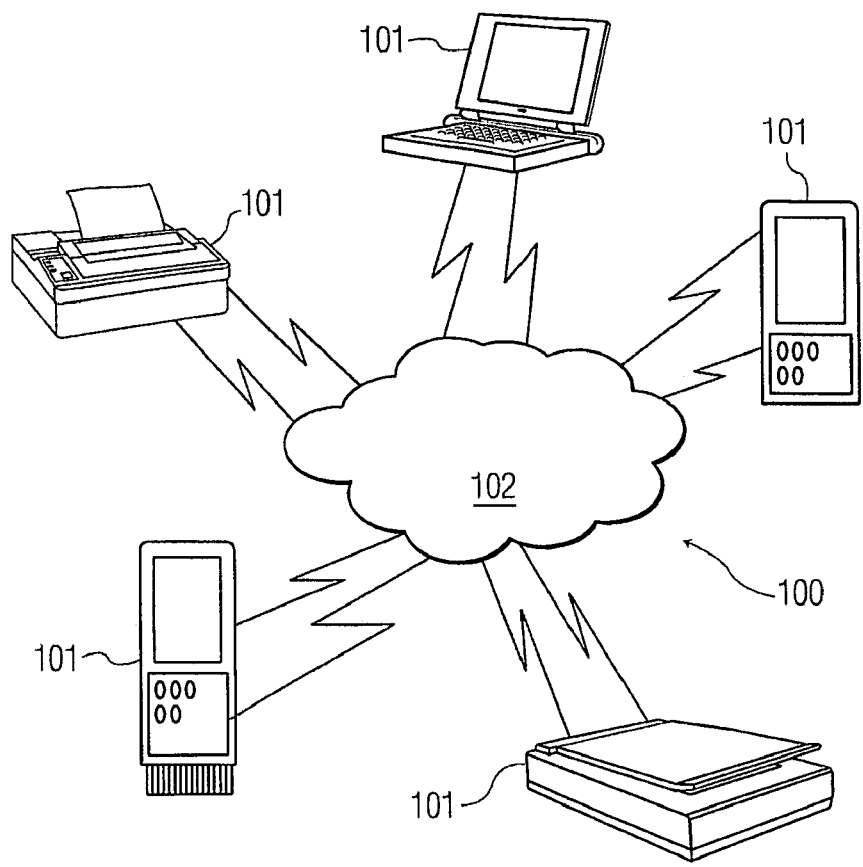
FIG. 1 illustrates a typical wireless network architecture having multiple antenna devices whereto embodiments of the present invention are to be applied.

FIG. 1 illustrates a representative multi-antenna wireless communication network 100 in whereto embodiments of the present invention are to be applied. The network includes a plurality of wireless devices 101, each modified according to the present invention to perform a ML decoding using a simplified distance calculation. According to the principle of the present invention, there is provided a simplified distance calculation scheme enabling a wireless device 101 to receive and decode signals based on ML decoding in a computationally cost effective manner.

Figure 2:
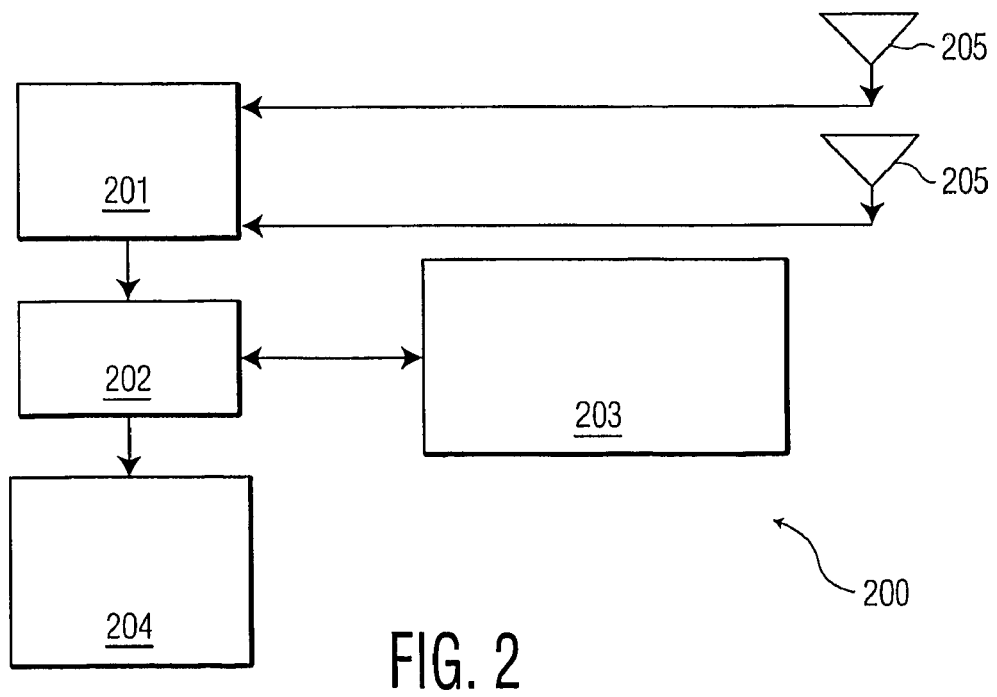
FIG. 2 illustrates a simplified block diagram of a multiple antenna wireless device modified according to an embodiment of the present invention.

Referring now to FIG. 2, each wireless device 101 within the WLAN 100 shown in FIG. 1 may include a system including an architecture that is illustrated in FIG. 2. Each wireless device 101 may include a plurality of antennas 205 coupled to a receiver 201 which communicates over the set of channels 102. The devices 101 each further comprise a processor 202 and a maximum likelihood decoder with simplified distance calculation. The processor is configured to receive from the receiver signals comprising a sequence of one or more symbols and to process the signal to provide bit metrics thereof to the deinterleaver and Viterbi decoder 204 which bit metrics have been calculated using the ML technique having simplified distance calculation according to the present invention.

The present invention provides a system and method for a distance calculation according to the observation. In optimal ML decoding, the following equation is used to calculate the bit metrics for a Viterbi decoder:

$$m_{1i}^P = \min_{\substack{a_m \in C_i^P \\ a_n \in C}} (\|r_1 - h_{11}a_m - h_{21}a_n\|^2 + \|r_2 - h_{12}a_m - h_{22}a_n\|^2)$$

$$m_{2i}^P = \min_{\substack{a_m \in C \\ a_n \in C_i^P}} (\|r_1 - h_{11}a_m - h_{21}a_n\|^2 + \|r_2 - h_{12}a_m - h_{22}a_n\|^2)$$

where $m_{1i}^P$ and $m_{2i}^P$ represent bit metrics of bit i in transmitted symbol $s_1$ and $s_2$ to be 'p', $p \in \{0,1\}$; C represents the whole constellation point set and $C_i^P$ the subset of the constellation point such that bit i is equal to p. Then the bit metrics pairs $(m_{1i}^0, m_{1i}^1)(m_{2i}^0, m_{2i}^1)$ are sent to a corresponding deinterleaver and Veterbi decoder for decoding both the bit streams. In a first embodiment of the invention, the metrics calculation is simplified to $$m_{1i}^P = \min_{\substack{a_m \in C_i^P \\ a_n \in C}} \left( \max\begin{pmatrix} \text{real}(r_1 - h_{11}a_m - h_{21}a_n), \\ \text{imag}(r_1 - h_{11}a_m - h_{21}a_n) \end{pmatrix} + \max(\text{real}(r_2 - h_{12}a_m - h_{22}a_n)), \\ \text{imag}(r_2 - h_{12}a_m - h_{22}a_n) \right)$$

$$m_{2i}^P = \min_{\substack{a_m \in C \\ a_n \in C_i^P}} \left( \max\begin{pmatrix} \text{real}(r_1 - h_{11}a_m - h_{21}a_n), \\ \text{imag}(r_1 - h_{11}a_m - h_{21}a_n) \end{pmatrix} + \max(\text{real}(r_2 - h_{12}a_m - h_{22}a_n)), \\ \text{imag}(r_2 - h_{12}a_m - h_{22}a_n) \right)$$

thereby reducing the computation cost by replacing the multiplication with comparison while providing a 2 dB gain over WZF for PER level of $10^{-2}$.

In a second embodiment of the invention, the metrics calculation is simplified to $$m_{1i}^p = \min_{\substack{a_m \in C_i^p \\ a_n \in C}} \begin{bmatrix} abs(real(r_1 - h_{11}a_m - h_{21}a_n)) + \\ abs(imag(r_1 - h_{11}a_m - h_{21}a_n)) + \\ abs(real(r_2 - h_{12}a_m - h_{22}a_n)) + \\ abs(imag(r_2 - h_{12}a_m - h_{22}a_n)) \end{bmatrix}$$

$$m_{2i}^p = \min_{\substack{a_m \in C \\ a_n \in C_i^p}} \begin{bmatrix} abs(real(r_1 - h_{11}a_m - h_{21}a_n)) + \\ abs(imag(r_1 - h_{11}a_m - h_{21}a_n)) + \\ abs(real(r_2 - h_{12}a_m - h_{22}a_n)) + \\ abs(imag(r_2 - h_{12}a_m - h_{22}a_n)) \end{bmatrix}$$

that reduces the computation cost by replacing the multiplication with addition while providing a 4 dB gain over WZF for PER level of $10^{-2}$ for 16/64 QAM modulation and 8 dB gain for BPSK modulation.

Optimal Single Input Single Output SISO Coded Orthogonal Frequency Division Multiplexing (COFDM) System Decoding The basic principle of Orthogonal Frequency Division Multiplexing (OFDM) is to split a high-rate data stream into a number of lower rate streams that are transmitted simultaneously over a number of sub-carriers. Because the symbol duration increases for the lower rate parallel sub-carriers, the relative amount of dispersion in time caused by multi-path delay spread decreases. Intersymbol interference eliminated almost completely by introducing a guard interval in every OFDM symbol.

In a single carrier system, since a time-dispersive channel (frequency selective fading channel) brings the channel memory into the system, joint maximum likelihood equalization and decoding is not realistic because of the high computation cost. The general practice is to first use minimum mean-square error (MMSE) as the criteria to equalize the channel. Then the equalized signal is sent to a maximum likelihood detector for further decoding. This is a sub-optimal system. In a COFDM system, since the system is designed to let each sub-carrier experience flat fading channel, the real maximum likelihood equalization and decoding can be implemented with affordable computation cost.

The architecture of a typical transceiver of an IEEE 802.11a based COFDM system can be found in Part 11: Wireless LAN Medium Access Control (MAC) and Physical Layer (PHY) specifications: High-speed Physical Layer in the 5 GHz Band, IEEE Std 802.11a, 199, that is hereby incorporated by reference in its entirety. In this transceiver, bitwise interleaving combined with Gray mapping is used. This technique, referred to as Bit Interleaved Coded Modulation (BICM), provides significantly better performance over Rayleigh fading channel than TCM with comparable complexity. The received signal in the frequency domain can be expressed as $$r_k = h_k s_k + n_k \quad (1)$$

where $h_k$ is the channel frequency response,
$s_k$ is the transmitted signal, and
$n_k$ is the complex white Gaussian noise with variance $\sigma_N^2$ at the $k^{th}$ subcarrier.

BICM allows a ML based decoding via a standard soft-input Viterbi decoder using the metric that is proportional to the logarithm of the conditional probability $$P(r_k | b_{ki}),$$

where $$P(r_k | b_{k,i} = p) = \prod_{a \in C_i^p} \frac{1}{\sqrt{2\pi}\,\sigma_N} e^{-\frac{\|r_k - h_k a\|^2}{2\pi\sigma_N^2}} \quad (2)$$

and where $b_{k,i}$ is the bit i in the symbol that is transmitted on subcarrier k, $C_i^p$ is the subset of constellation points such that bit i equal to p, where p is either 0 or 1.

Determining the soft bits according to equations (2) is still very complex. A common simplification is to consider only the maximum term of (2), see, e.g., Speth, M.; Senst, A.; Meyr, H, "Low complexity space-frequency Maximum Likelihood Sequence Estimation (MLSE) for Multi-user COFDM", GLOBECOM '99, Vol. 5, 1999, pp 2395-2399, the entire contents of which is hereby incorporated by reference its entirety. Thus the maximum likelihood sequence estimation requires a metric as $$m_i^p = \min_{a \in C_i^p} \|r_k - h_k a\|^2, \, p = 0, 1 \quad (3)$$

to be sent to the Viterbi decoder. For the 64 QAM case, to obtain a bit metric for a bit to be '1' or '0', one needs to calculate 32 distances $$\|r_k - h_k a\|^2$$

with different constellation points a, in which bit i is '1' or '0', to find the minimum value of these distances.

Optimal 2 by OFDM System Decoding

Figure 3:
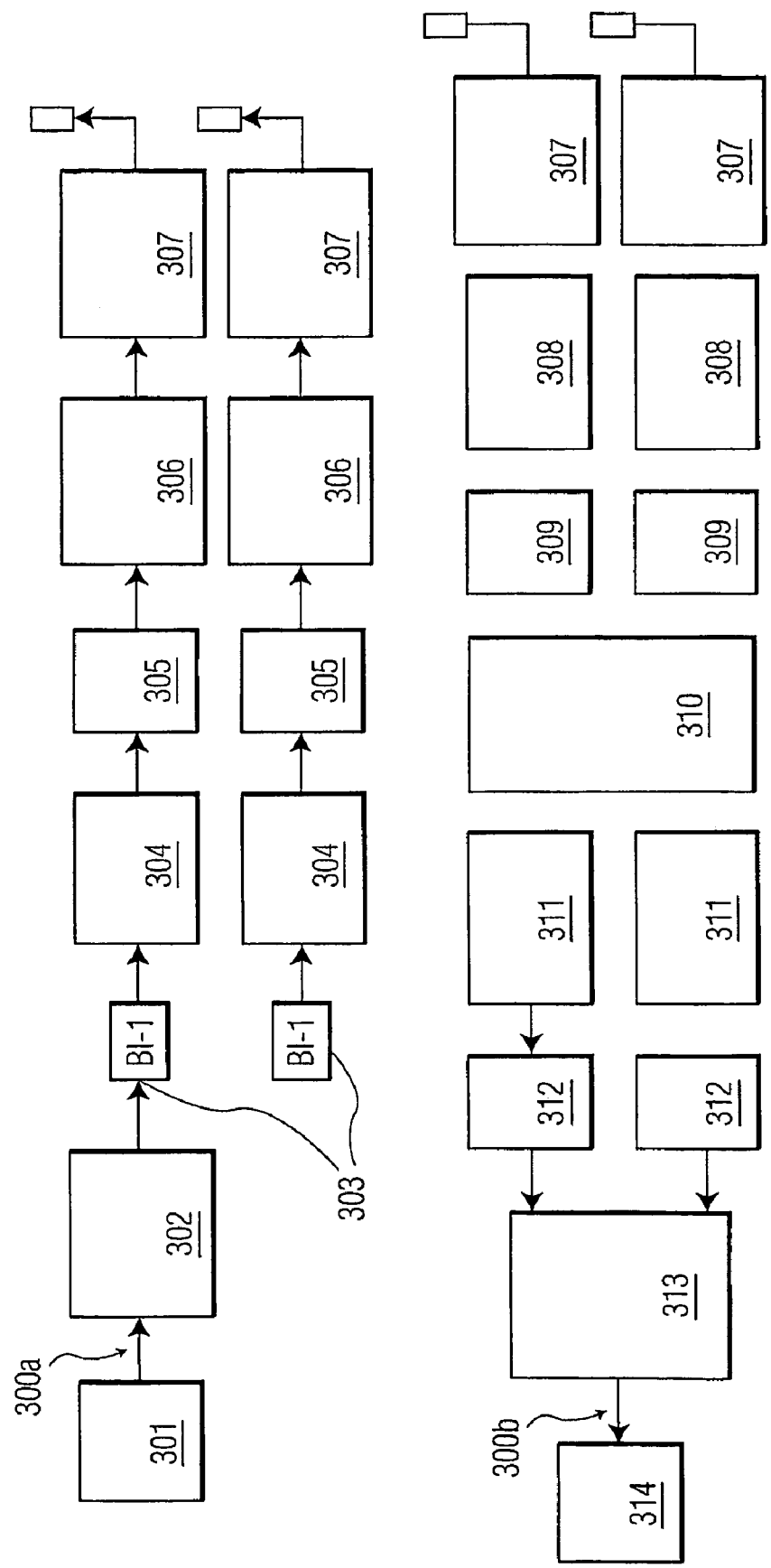
FIG. 3 illustrates a 2 by 2 MIMO system structure.

A diagram of a 2 by MIMO system based on IEEE 802.11a 54 Mbps mode OFDM system is illustrated in FIG. 3. Defining the wireless channel to be $$H = \begin{pmatrix} h_{11} & h_{21} \\ h_{12} & h_{22} \end{pmatrix},$$

where $h_{ij}$ represents the channel from transmitter antenna i to receiver antenna j on subcarrier k. Since the operation of each subcarrier is the same, to save space, the subscript k is omitted in the following discussion. Without losing generality assume the four channels are independent Rayleigh fading channels. The received signal can be expressed as $$\begin{pmatrix} r_1 \\ r_2 \end{pmatrix} = \begin{pmatrix} h_{11} & h_{21} \\ h_{12} & h_{22} \end{pmatrix} \begin{pmatrix} s_1 \\ s_2 \end{pmatrix} + \begin{pmatrix} n_1 \\ n_2 \end{pmatrix} \quad (4)$$

Analogous to the ML detection for the SISO system, for each received signal pair, $r_1$ and $r_2$, in order to find out the bit metrics for a bit in symbol $S_1$ and $S_2$, the following equation should be satisfied $$m_{1i}^p = \min_{\substack{a_m \in C_i^p \\ a_n \in C}} (\|r_1 - h_{11}a_m - h_{21}a_n\|^2 + \|r_2 - h_{12}a_m - h_{22}a_n\|^2) \quad (5)$$

$$m_{2i}^p = \min_{\substack{a_m \in C \\ a_n \in C_i^p}} (\|r_1 - h_{11}a_m - h_{21}a_n\|^2 + \|r_2 - h_{12}a_m - h_{22}a_n\|^2)$$

where $m_{1i}^p$ and $m_{2i}^p$ represent bit metrics of bit i in transmitted symbol $s_1$ and $s_2$ to be 'p', $p \in \{0,1\}$; C represents the whole constellation point set and $C_i^p$ the subset of the constellation point such that bit i is equal to p. Then the bit metrics pairs $(m_{1i}^0, m_{1i}^1)(m_{2i}^0, m_{2i}^1)$ are sent to corresponding deinterleavers and Viterbi decoders for decoding both the bit streams.

Weighted ZF Decoding

For simplicity, only 2 by 2 MIMO analysis is given in detail. The same principle can be readily used by n-by-n MIMO system. Rewriting the received signal in (4) in matrix format results in $$r = Hs + n \quad (6)$$

With ZF filter, the estimation of the transmitted signal is $$\hat{s} = (H^H H)^{-1} H^H r \quad (7)$$

With MMSE filter, the estimation of the transmitted signal is $$\hat{s} = ((H^H H)^{-1} H^H + \sigma^2) r \quad (8)$$

The estimation error (for ZF only, the MMSE analysis will follow the same principle with additional noise variance item) is $$\epsilon = \hat{s} - s = (H^H H)^{-1} H^H n \quad (9)$$

With variance $$R_\epsilon = E[\epsilon \cdot \epsilon^H] = \sigma_N^2 (H^H H)^{-1} \quad (10)$$

Thus the multi-dimensional complex joint probability distribution is $$p(\hat{s} \mid s) = \frac{1}{\sqrt{\pi^N |R_\epsilon|}} e^{\left(-(\hat{s}-s)^H R_\epsilon^{-1}(\hat{s}-s)\right)} \quad (11)$$

Since $R_\epsilon$ is not a diagonal matrix, the bit metrics calculation cannot be separated for these two symbol detections. To simplify the calculation, an uncorrelated normal distribution is assumed for the components of (11). Then the bit metrics can be calculated as $$m_{1i}^p = \min_{a \in C_i^p} \left( \frac{\|\hat{s}_1 - a\|^2}{R_{\epsilon 11}} \right) \quad (12)$$

$$m_{2i}^p = \min_{a \in C_i^p} \left( \frac{\|\hat{s}_1 - a\|^2}{R_{\epsilon 22}} \right)$$

where $m_{1i}^p$ and $m_{2i}^p$ represents bit metrics of bit i in transmitted symbol $s_1$ and $s_2$ to be 'p', $p \in \{0,1\}$; $C_i^p$ the subset of the constellation point such that bit i is equal to p. Then the bit metrics pairs $(m_{1i}^0, m_{1i}^1)(m_{2i}^0, m_{2i}^1)$ are sent to corresponding deinterleavers and Viterbi decoders for decoding both the bit streams.

Simplified ML Decoding

ZF decoding has the problem of boosting noise if the channel matrix is ill conditioned. Weighted ZF partly solves this problem by giving low weight to the bit metrics calculated from the ill-conditioned channel. Using this approach a Viterbi decoder is not disturbed by some very erroneous bit metrics. This is similar to puncturing a sequence to set those erroneous bit metrics almost to zero. The following decoder attempts to recover those bits using some reliable bits information around those bits.

In the present invention, a decoding method is used having a basic principle that is the same as ML decoding. The only difference is replacing the distance calculation of the ML criteria by an approximate distance calculation that is less computationally intensive. The bit metrics is then simplified as follows.

(1) In a first embodiment $$m_{1i}^p = \min_{\substack{a_m \in C_i^p \\ a_n \in C}} \left( \begin{array}{l} \max\left(\begin{array}{l} \text{real}(r_1 - h_{11}a_m - h_{21}a_n), \\ \text{imag}(r_1 - h_{11}a_m - h_{21}a_n) \end{array}\right) + \\ \max(\text{real}(r_2 - h_{12}a_m - h_{22}a_n)), \\ \text{imag}(r_2 - h_{12}a_m - h_{22}a_n) \end{array} \right) \quad (13)$$

$$m_{2i}^p = \min_{\substack{a_m \in C \\ a_n \in C_i^p}} \left( \begin{array}{l} \max\left(\begin{array}{l} \text{real}(r_1 - h_{11}a_m - h_{21}a_n), \\ \text{imag}(r_1 - h_{11}a_m - h_{21}a_n) \end{array}\right) + \\ \max(\text{real}(r_2 - h_{12}a_m - h_{22}a_n)), \\ \text{imag}(r_2 - h_{12}a_m - h_{22}a_n) \end{array} \right)$$

reducing the computation cost by replacing the multiplication with comparison while providing a 2 dB gain over WZF for PER level of $10^{-2}$.

The number of multiplications needed for the simplified ML decoding to find the bit metrics for all the bits transmitted in one packet is 4*M, where M is the constellation order, assuming the channel remains quasi-static for one OFDM packet. For WZF method, the multiplications needed for one packet is 8*N*K, where N is the number of data sub-carriers in one OFDM symbol and K is the number of OFDM symbols in one packet.

As an example only, the number of multiplications for SML, WZF and ML decoders are calculated as follows:

a. a packet contains—
  (i) 1000 bytes,
  (2) 96 data sub-carriers in one OFDM symbol; and
b. 64 QAM is used to transmit the data using a 2 by 2 MIMO system of the first embodiment.

For the whole packet:—
a. SML requires 4*64*96=24567 complex multiplications,
b. WZF requires 6*96+8*96*10=8256 complex multiplications, and
c. optimal ML decoding requires 4*64*96+96*10*2+64*64*96*10*2=7890816 complex multiplications.

For a single bit:—
a. SML requires about 24567/(1000*8)~=3 complex multiplications,
b. WZF requires about 8256/(1000*8)'=1 complex multiplication, and
c. optimal ML decoding requires about 7890816/(1000*8)~=986 complex multiplications By contrast, in the first embodiment the number of comparisons to search for a minimum distance is:—
a 64*64=4096 for SML
b. 64*2=128 for WZF, and
c. 64*64=4096 for optimal ML decoding.

The first embodiment has been simulated to measure the performance of the simplified ML decoding method as compared to SML and WZR. Results are presented as the PER vs. SNR curve illustrated in FIG. 4. The simulation parameters are listed in Table 1.

TABLE 1

Figure 4:
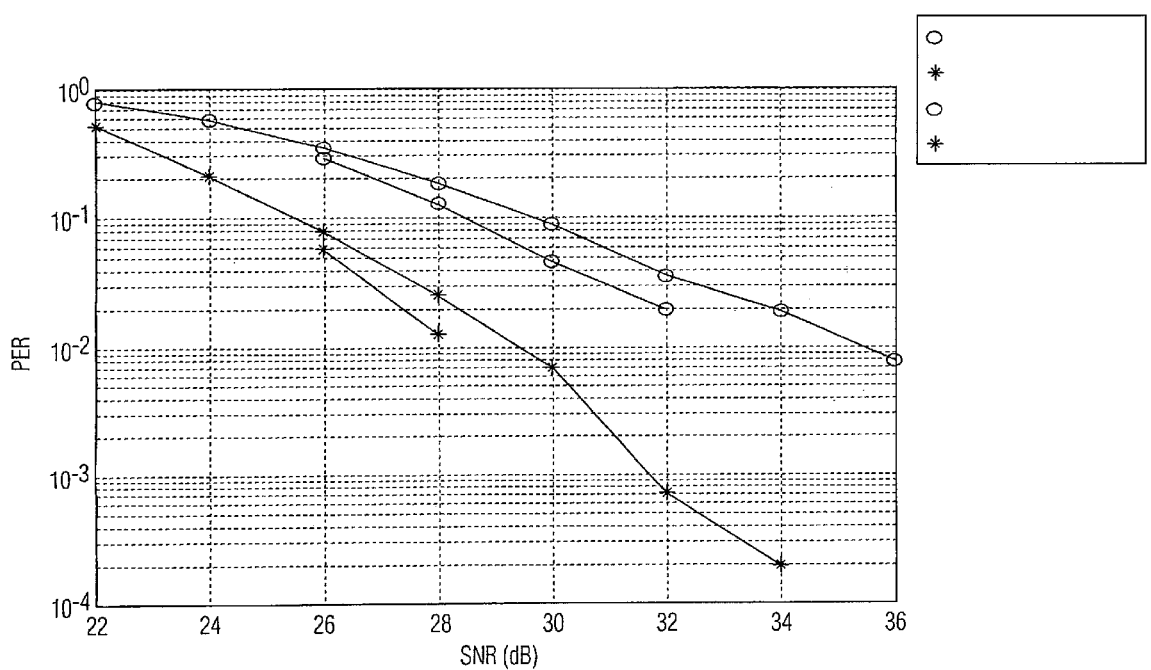
FIG. 4 illustrates the BER and PER vs. SNR curve in a first embodiment.

Simulation parameters for FIG. 4

| System config | Rate* Mbps | Chnnl Bdwth MHz | GI Lgths | OFDM Sym Lgths | FFT Lgth | # Sub-carriers | Mod-ulation | CC Rate | RS Rate |
|---|---|---|---|---|---|---|---|---|---|
| 2 by MIMO | 120 | 20 | 0.8 | 6.4 | 128 | 96 | 64QAM | 3/4 | (220,200) |

From FIG. 4 it is obvious that there are about 2 dB gain of SML over WZF at PER level of $10^{-2}$ without RS code. If RS code is in effective, the performance gain is larger because as one can see from the figure, after 28 dB, the PER is 0.

(2) In a second embodiment $$m_{1i}^p = \min_{\substack{a_m \in C_i^p \\ a_n \in C}} \begin{bmatrix} abs(real(r_1 - h_{11}a_m - h_{21}a_n)) + \\ abs(imag(r_1 - h_{11}a_m - h_{21}a_n)) + \\ abs(real(r_2 - h_{12}a_m - h_{22}a_n)) + \\ abs(imag(r_2 - h_{12}a_m - h_{22}a_n)) \end{bmatrix} \quad (14)$$

$$m_{2i}^p = \min_{\substack{a_m \in C \\ a_n \in C_i^p}} \begin{bmatrix} abs(real(r_1 - h_{11}a_m - h_{21}a_n)) + \\ abs(imag(r_1 - h_{11}a_m - h_{21}a_n)) + \\ abs(real(r_2 - h_{12}a_m - h_{22}a_n)) + \\ abs(imag(r_2 - h_{12}a_m - h_{22}a_n)) \end{bmatrix}$$

The simplified ML decoding requires 4*M complex multiplications to find the bit metrics for all the bits transmitted in one sub-carrier, where M is the constellation order. For a WZF method, the multiplications needed for one sub-carrier is 8 no matter what modulation scheme is used. As an example only, the number of multiplications for SML, WZF and ML decoders are compared. Assuming one packet contains 1000 information bytes, 96 data sub-carriers in one OFDM symbol, 64 QAM is used to transmit the data and compared to a 2 by 2 MIMO system according to the present invention. A packet contains about 10 OFDM symbols for the given OFDM and modulation parameters.

To decode one packet:

SML requires 4*64*96=24576 complex multiplications,
WZF requires about 6*96+8*96*10=8256 complex multiplications,
optimal ML decoding requires about 4*64*96+64*64*96*10*2=7888896.

For a single bit:
SML requires about 24576/(1000*8)~=3 complex multiplications,
WZF requires 8256/(1000*8)~=1 multiplications, and
optimal ML requires 7888896/(1000*8)~=986 multiplications.

To find the minimum distance:
SML requires 64*64=4096 additions,
WZF requires 64*2=128 additions, and
optimal ML requires 64*64=4096 additions.

The second embodiment has been simulated to determine the performance for the simplified ML decoding method as compared to SML and WZR. Results are presented as the PER vs. SNR curves for different modulation schemes illustrated in FIGS. 5a-c. The simulation parameters are listed in Table 2.

TABLE 2

Figure 5A:
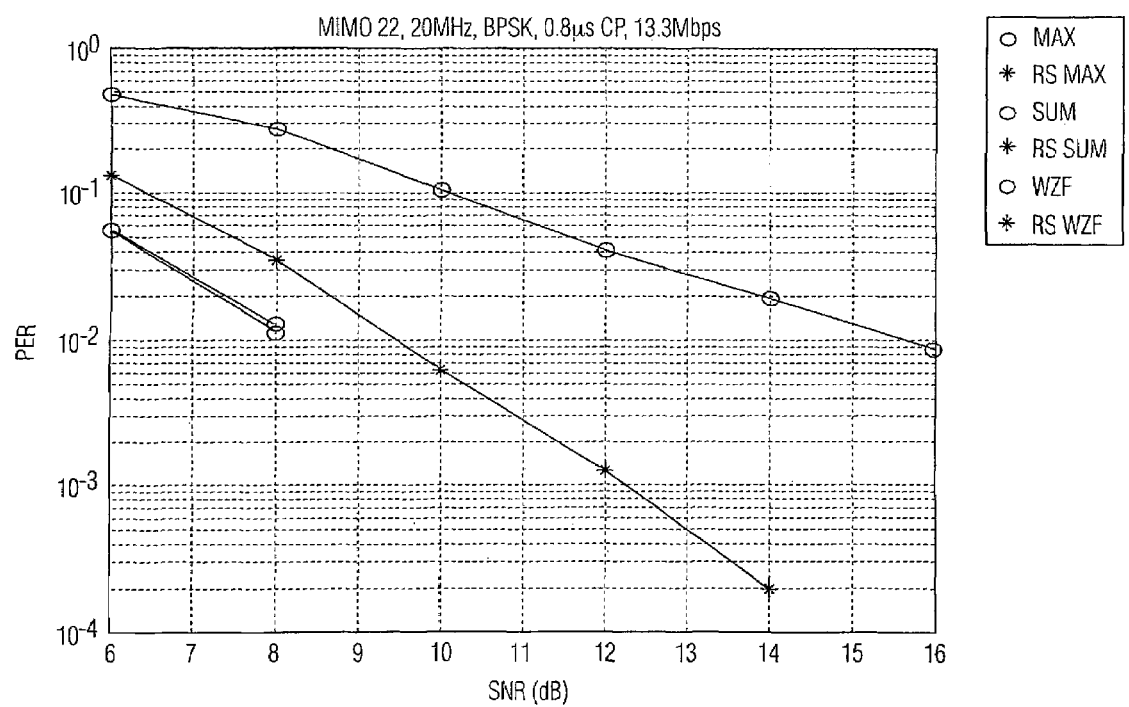
FIG. 5 illustrates PER vs. SNR curves for different modulation in a second embodiment.
Figure 5B:
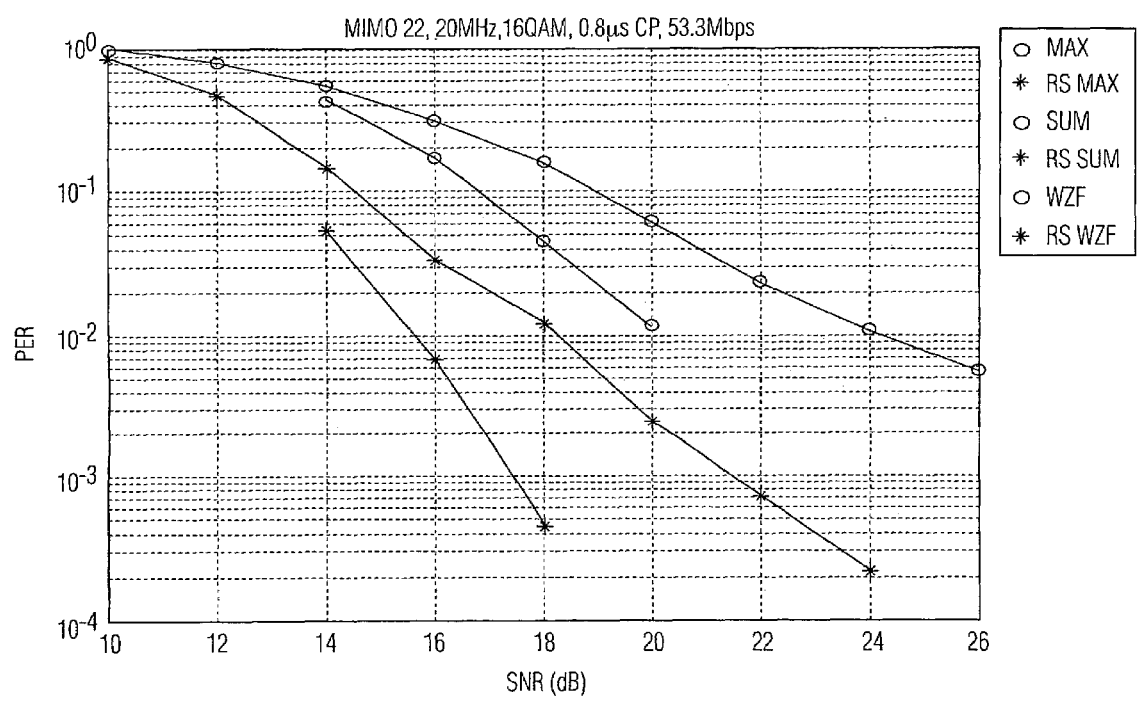
Figure 5C:
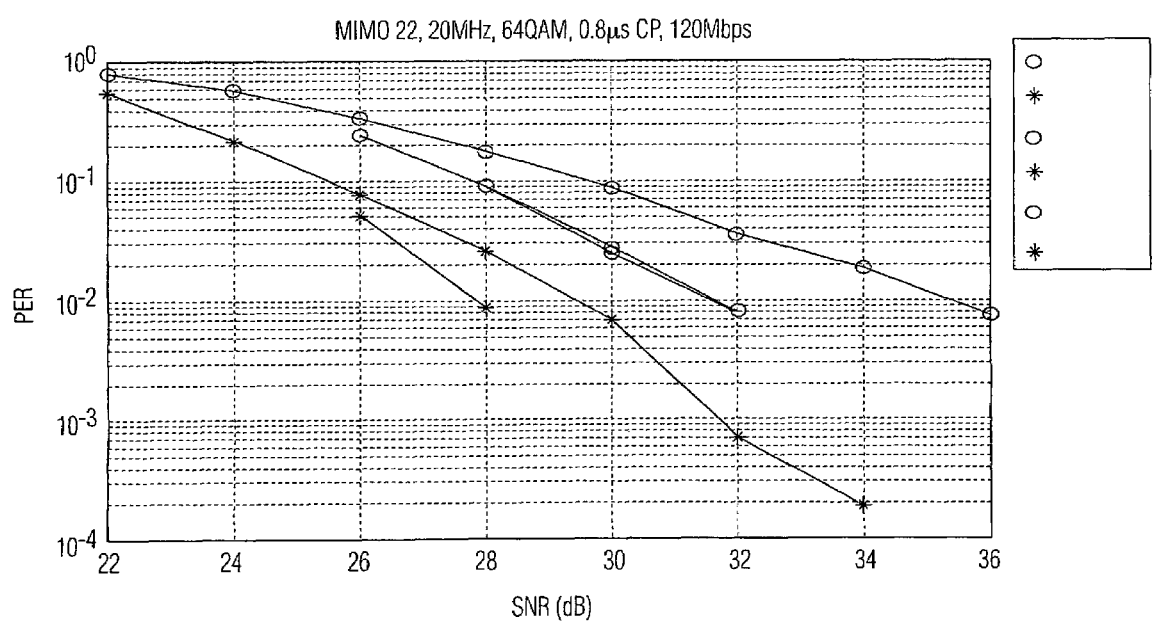

Simulation parameters for FIGS. 5a-c.

| System config-uration | Data Rate* (Mbps) | Channel Bndwth (MHz) | GI Lgth (us) | OFDM Sym Lgth (us) | FFT Lgth | No. of Data Sub-carriers | Mod-ulation | CC Rate | RS Rate |
|---|---|---|---|---|---|---|---|---|---|
| 2 by MIMO | 13.3 | 20 | 0.8 | 6.4 | 128 | 96 | BPSK | 3/4 | (220,200) |
| 2 by MIMO | 53.3 | 20 | 0.8 | 6.4 | 128 | 96 | 16QAM | 3/4 | (220,200) |
| 2 by MIMO | 120 | 20 | 0.8 | 6.4 | 128 | 96 | 64QAM | 3/4 | (220,200) |

*The data rate is calculated without RS code. If RS code is considered, the corresponding data rate should be reduced according to the RS code rate.

Referring now to FIGS. 5a-c, it can be seen that there are about 8 dB gain of the SML over WZF at PER level of $10^{-2}$ without RS code for 16 QAM and 64 QAM modulation, and about 8 dB gain for BPSK modulation.

A MIMO system and method according to the present invention can be used in systems and methods according to the IEEE 802.11n standard since the decoding method in this invention can be used in any 11n decoder. However, the application of the present invention is not limited to only 11n devices since a general decoding system and method are provided. That is, the system and method of the present invention can be used for any convolutional coded BICM MIMO system, and especially good a wireless system having a small number of antennas, such as 2 by 2 MIMO. Since the system and method of the present invention comprises a simplified ML decoding method, any communication system using ML decoding can take advantage of the present invention to reduce the computation cost for system implementation.

A decoder according to the system and method of the present invention provides a level of error performance that approximates a level of error performance provided by a maximum likelihood decoder ML.

While the preferred embodiments of the present invention have been illustrated and described, it will be understood by those skilled in the art that the superframe as described herein is illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling with the scope of the appended claims.

We claim:

1. A method of decoding received signals in a multiple in multiple out wireless communication system (100), comprising the steps of:
    receiving (201) at least a pair of bit streams each comprising at least one symbol; and
    decoding (203) the received at least one pair of bit streams by an optimal maximum likelihood (ML) decoder that employs a simplified bit metrics calculation having a reduced computational cost, wherein a level of error performance is a gain of 2 dB over weighted zero forcing (WZF) for a packet error rate (PER) level of $10^{-2}$.

2. The method of claim 1 wherein, the simplified bit metrics calculation replaces at least one multiplication with a comparison operation.

3. The method of claim 1, wherein the decoding step (203) provides a level of error performance that approximates a level of error performance provided by a maximum likelihood decoder.

4. The method of claim 1 wherein the simplified bit metrics calculation replaces at least one multiplication with an addition operation.

5. The method of claim 1, wherein the decoding step (203) provides a level of error performance that approximates a level of error performance provided by a maximum likelihood decoder ML.

6. The method of claim 1, wherein the decoding step further comprises the steps of calculating (203) the simplified bit metrics and sending the calculated bit metrics to a corresponding deinterleaver and Viterbi decoder (204) for decoding the bit streams.

7. An apparatus for decoding received signals in a multiple in multiple out wireless communication system, comprising:
    a receiver (201) operative to receive at least a pair of bit streams each comprising at least one symbol; and
    a decoder (203) configured to implement a decoding operation for the received at least a pair of bit streams as a maximum likelihood decoder that utilizes a simplified bit metrics calculation having a reduced computational cost, wherein a level of error performance is a gain of 2 dB over weighted zero forcing (WZF) for a packet error rate (PER) level of $10^{-2}$.

8. The apparatus of claim 7 wherein, the simplified bit metrics calculation replaces at least one multiplication with a comparison operation.

9. The apparatus of claim 7, wherein the decoder (203) provides a level of error performance that approximates a level of error performance provided by a maximum likelihood decoder ML.

10. The apparatus of claim 7, wherein the simplified bit metrics calculation replaces at least one multiplication with an addition operation.

11. The apparatus of claim 7, wherein the decoder (203) provides a level of error performance that approximates a level of error performance provided by a maximum likelihood decoder.

12. The apparatus of claim 7, wherein the apparatus further comprises at least one deinterleaver and Viterbi decoder (204) operatively coupled to the decoder (203), the decoder (203) being configured to calculate the simplified bit metrics and send the calculated bit metrics to a corresponding deinterleaver and Viterbi decoder (204) for decoding the bit streams.

* * * * *